G. R. HARRILD.
EVAPORATIVE REFRIGERATOR.
APPLICATION FILED MAY 10, 1912.
1,071,047.
Patented Aug. 26, 1913.
2 SHEETS—SHEET 1.
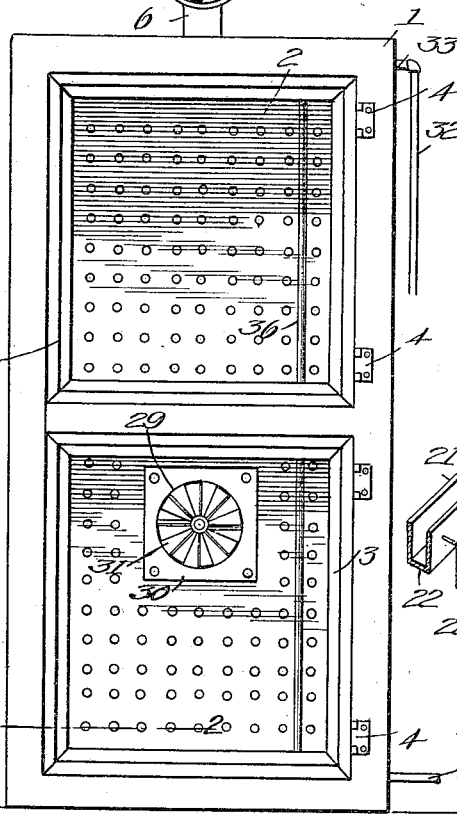
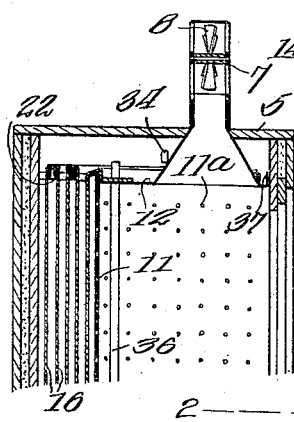
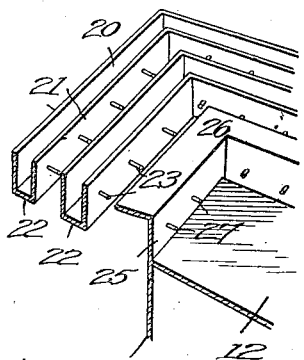
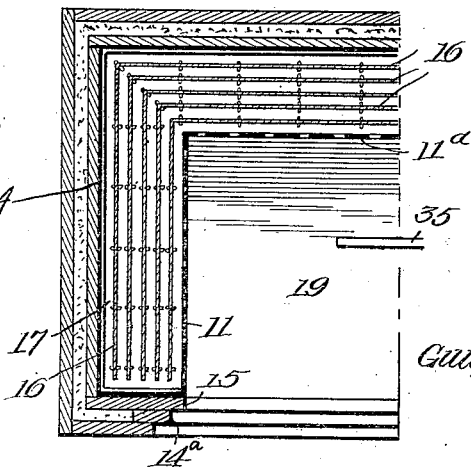
WITNESSES
INVENTOR
Guilford R. Harrild
BY Munn & Co.
ATTORNEYS

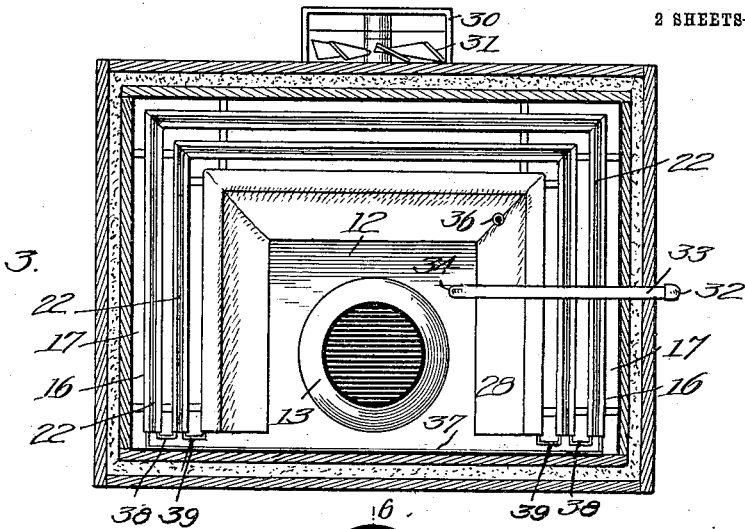
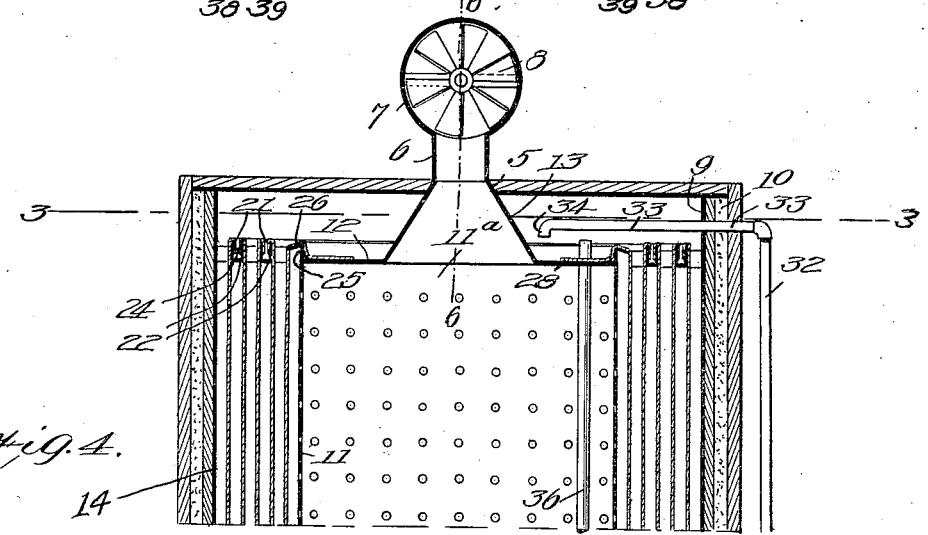

UNITED STATES PATENT OFFICE.

GUILFORD ROWE HARRILD, OF SPOKANE, WASHINGTON, ASSIGNOR OF ONE-HALF TO JOSEPH W. CODD, OF SPOKANE, WASHINGTON.

EVAPORATIVE REFRIGERATOR.

1,071,047. Specification of Letters Patent. Patented Aug. 26, 1913.

Application filed May 10, 1912. Serial No. 696,430.

*To all whom it may concern:*

Be it known that I, GUILFORD R. HARRILD, a citizen of the United States, residing at Spokane, in the county of Spokane and State of Washington, have invented a new and useful Improvement in Evaporative Refrigerators, of which the following is a specification.

My invention is an improvement in evaporative refrigerators, and has for its object, the provision of a simple device of the character specified, wherein the refrigeration is brought about by the forced evaporation of water, and which is economical both in construction and operation.

In the drawings, Figure 1 is a front view of the improvement. Fig. 2 is a section on the line 2—2 of Fig. 1. Fig. 3 is a section on the line 3—3 of Fig. 4. Fig. 4 is an enlarged vertical transverse section. Fig. 5 is a detail perspective view of a portion of the gutters, and Fig. 6 is a section on the line 6—6 of Fig. 4.

The present embodiment of the invention comprises a casing 1 of wood or like material, having upper and lower door openings 2 and 3 respectively, each of which is provided with a door (not shown) hinged at 4 to the casing. An opening 5 is provided on the top of the casing, and a pipe 6 is arranged in the opening, the top of the pipe communicating with a fan casing 7, in which is arranged a fan 8. The side walls of the casing are double, the casing having an inner wall 9 spaced apart from the outer wall, and a filling 10 of suitable non-heat conducting material is arranged between the walls.

An inner receptacle is arranged within the casing, the side walls 11, and rear wall 11ᵃ of the receptacle being formed of perforate material, while the top wall 12 is solid or imperforate, and is connected to the lower end of pipe 6, by a tapering pipe section 13. The receptacle has no front wall, the front edges of the side walls being integral with a lining 14 of metal, which completely covers that portion of the front wall of the casing between the door opening and the side walls, the inner walls and the inner rear wall of the casing, and the top and bottom of the same, fitting around the pipe 13 at the top of the casing.

The inner wall 9 of the casing extends beyond the outer wall at the door opening as shown at 15 (Fig. 4) and a strip 14ᵃ is arranged between the walls, and the outer edge of the strip is spaced away from the free edge of the portion 15 of the inner wall, and from the free edge of the outer wall. The edges of the door opening are thus stepped, and the edges of the door are shaped to correspond and to fit the said edges.

The side and rear walls of the receptacle, and the top thereof are spaced some considerable distance away from the casing wall, and a plurality of layers 16 of cloth is arranged between the side and rear walls of the receptacle and the side and rear walls of the casing. The layers 16 are five in number in the present instance, and they are spaced at equal distances from each other and from the walls. As shown in Fig. 2, each layer 16 extends from one side of the door opening, at a point near the portion of the lining 14 between the door openings and the adjacent side wall, to a corresponding point at the opposite side of the door opening, and each layer has a portion extending parallel with each side wall, and a portion parallel with the rear wall. There is thus provided a plurality of separated air spaces 17, that is the air in the space between the receptacle and the casing is divided into a plurality of layers. Each of the layers 16 of cloth extends from the bottom of the casing to the top of the receptacle, and at the bottom each layer or sheet of cloth is held by a plurality of hooks 18, secured to the bottom of a pan 19, in the casing. The outermost layers or sheets 16, at the top edges, are engaged over the side walls of metallic gutters 20, each gutter having parallel side walls 21, connected by a bottom wall 22, Fig. 5. Each of the side walls of the gutters is provided with laterally extending pins 23, which pass through the cloth and the upper edge of each sheet is folded over on the inner side of the adjacent wall, as indicated at 24. The gutters 20 are spaced apart from each other, and each gutter has a portion parallel with each side wall and a portion parallel with the rear wall, and two layers or sheets of cloth are connected with each gutter. The top 12 of the receptacle is spaced below the upper edges of the side and rear walls 11 and 11ᵃ, to form a rib 25, extending to approximately the level of the upper edges of the gutters. The rib is flanged laterally outward, as shown at 26, and is provided with inwardly extending pins 27 similar to the pins 23, and the upper edge of the innermost layer or sheet 16 of cloth is folded inwardly over the flange 26, and downwardly on the inner face of rib 25 and is engaged with the pins 27. The flange 26 spaces the layer or sheet away from the receptacle walls, and the free edge of the sheet rests upon the upper face of the top 12, as shown at 28.

It will be noticed from an inspection of Fig. 3, that while each gutter consists of two side portions connected by a rear portion, the gutters are connected with the tank at the front of the casing. The outer side walls of the side portions of the outer gutter are connected at their front ends by a strip 37 extending along the front of the casing. At their front ends, the adjacent walls of the side portions of the gutters are connected by strips 38, and the open front end of the side portions of the gutters are connected to the tank by lateral extensions 39 from the tank, the side wall 25 of the tank being extended to form the extensions.

The rear wall of the casing, both inner and outer, the lining, each layer or sheet 16, and the rear wall of the receptacle, are perforated in alinement, as shown at 29, and a fan casing 30 is secured to the rear face of the rear wall, over the perforation, and a fan 31 is arranged in the casing 30. The said casing 30 is slightly below the center of the casing 1.

The pan 19 is supported by the layers or sheets 16 of cloth, and is normally held above the lining of the bottom of the casing, and by its weight holds the layers or sheets taut. It is obvious that a greater or less number of sheets might be used, if desired. The said sheets should be of sufficient number to correspond with the size of the refrigerator.

A pipe 32 is arranged in vertical position alongside the casing 1, and a lateral pipe 33 extends from the top of pipe 32 into the casing. The pipe 33 extends beyond the adjacent side wall of the receptacle, and is provided with a downwardly directed outlet 34. A pipe 35 extends horizontally from about the center of the receptacle, entirely through the receptacle wall, layers 16 and casing side wall, opening outside of the casing. A third pipe 36 is arranged vertically in one of the rear corners of the receptacle, the upper end extending above the top 12 of the receptacle, and the lower end being spaced above pan 19. The pipe 32—33 is a supply pipe, and supplies water to the tank formed by top 12, the rib 25, and the strip 37. The pipe 36 is an overflow pipe for the said tank, and conducts the overflow downwardly into the pan 19. The pipe 35 is also an overflow pipe for the pan. The pipe 32—33 supplies a constant flow of water to the tank, and the layers or sheets 16 of cloth are absorbent, and take up the water from the tank, so that they are wet from top to bottom.

The fan 31 is arranged to supply the air to the refrigerator, while the fan 8 is arranged to exhaust air therefrom. A constant circulation of fresh air is thus maintained, and the water on the cloths is evaporated very quickly, thus cooling the refrigerator. Should the water supply exceed the capability of the sheets for absorption, the excess is passed down through pipe 36 into the pan. Any drip from the cloths is also received in the pan, and when the water in the pan exceeds a predetermined level, it is drawn off through pipe 35.

The filling 10 is preferably of asbestos, and it will be evident that any thing held in the receptacle will be thoroughly refrigerated. The perforate side and rear walls of the receptacle permit the air to be constantly changed by the fans, and the constant circulation assures a rapid evaporation.

The sheets 16 are kept separated at all times so that quite a large quantity of air will be brought into contact with the saturated sheets, thus insuring a constant evaporation from the cloths. If desired, the space between the walls of the casing may be left as a dead air space, that is the filling 10 may be omitted.

With small refrigerators, constructed in accordance with the improvement, the fans may not be necessary, and it is obvious that any other method of creating a brisk circulation of the air over the saturated cloths might be used.

I claim,

1. A refrigerator, comprising an outer casing, a receptacle within the casing and spaced apart from the casing, said receptacle having perforate side walls, and a solid top, a rib inclosing the top and extending above the same to form an open tank, the rib having an outwardly extending lateral flange, a plurality of gutters, each gutter consisting of a rear transverse portion and a side portion extending forwardly from each end of the rear portion, said gutters being arranged at the level of the tank and being spaced apart from each other and from the rib and the casing, each wall of each gutter having outwardly extending pins and the rib having inwardly extending pins, the gutters communicating with the tank, a sheet of absorbent material connected with the rib and depending alongside the side and rear walls of the receptacle and spaced away therefrom by the flange, a sheet of absorbent material depending from each wall of each gutter, said sheets engaging the pins and each having its upper edge extending into the gutter, the first named sheet having its upper edge extending into the tank, a pan below the receptacle, a series of hooks for each sheet in the pan, the series being spaced apart to hold the sheets separated, said casing having a metallic lining, means for supplying water to the tank, an overflow pipe for conducting the excess water from the tank to the pan, an overflow pipe for the pan, said casing having openings in its top and in its rear wall, and a fan casing communicating with each opening.

2. A refrigerator, comprising an outer casing, a receptacle within the casing and spaced apart from the casing, said receptacle having perforate side walls, and a solid top, a rib inclosing the top and extending above the same to form an open tank, the rib having an outwardly extending lateral flange, a plurality of gutters, each gutter consisting of a rear transverse portion and a side portion extending forwardly from each end of the rear portion, said gutters being arranged at the level of the tank and being spaced apart from each other and from the rib and the casing, each wall of each gutter having outwardly extending pins and the rib having inwardly extending pins, the gutters communicating with the tank, a sheet of absorbent material connected with the rib and depending alongside the side and rear walls of the receptacle and spaced away therefrom by the flange, a sheet of absorbent material depending from each wall of each gutter, said sheets engaging the pins and each having its upper edge extending into the gutter, the first named sheet having its upper edge extending into the tank, a pan below the receptacle, a series of hooks for each sheet in the pan, the series being spaced apart to hold the sheets separated, said casing having a metallic lining, means for supplying water to the tank, an overflow pipe for conducting the excess water from the tank to the pan, an overflow pipe for the pan, and means for causing air to circulate into and out of the casing over the sheets.

3. A refrigerator, comprising an outer casing, a receptacle within the casing and spaced apart from the casing, said receptacle having perforate side walls, and a solid top, a rib inclosing the top and extending above the same to form an open tank, the rib having an outwardly extending lateral flange, a plurality of gutters, each gutter consisting of a rear transverse portion and a side portion extending forwardly from each end of the rear portion, said gutters being arranged at the level of the tank and being spaced apart from each other and from the rib and the casing, each wall of each gutter having outwardly extending pins and the rib having inwardly extending pins, the gutters communicating with the tank, a sheet of absorbent material connected with the rib and depending alongside the side and rear walls of the receptacle and spaced away therefrom by the flange, a sheet of absorbent material depending from each wall of each gutter, said sheets engaging the pins and each having its upper edge extending into the gutter, the first named sheet having its upper edge extending into the tank, a pan below the receptacle, a series of hooks for each sheet in the pan, the series being spaced apart to hold the sheets separated, means for supplying water to the tank and gutters means for delivering the excess water from the casing, and means for causing a circulation of air through the casing in contact with the sheets.

4. A refrigerator, comprising an outer casing, a receptacle within the casing and spaced apart from the casing, said receptacle having perforate side walls, and a solid top, a rib inclosing the top and extending above the same to form an open tank, the rib having an outwardly extending lateral flange, a plurality of gutters, each gutter consisting of a rear transverse portion and a side portion extending forwardly from each end of the rear portion, said gutters being arranged at the level of the tank and being spaced apart from each other and from the rib and the casing, each wall of each gutter having outwardly extending pins and the rib having inwardly extending pins, the gutters communicating with the tank, a sheet of absorbent material connected with the rib and depending alongside the side and rear walls of the receptacle and spaced away therefrom by the flange, a sheet of absorbent material depending from each wall of each gutter, said sheets engaging the pins and each having its upper edge extending into the gutter, the first named sheet having its upper edge extending into the tank, a pan below the receptacle, a connection between the lower edge of each sheet and the pan, means for supplying water to the tank and gutters, means for conducting the excess water from the pan, and means for circulating air through the casing in contact with the sheets.

5. A refrigerator, comprising an outer casing, a receptacle within the casing and spaced apart from the casing, said receptacle having perforate side walls, and a solid top—a rib inclosing the top and extending above the same to form an open tank, the rib having an outwardly extending lateral flange, a plurality of gutters, each gutter consisting of a rear transverse portion and a side portion extending forwardly from each end of the rear portion, said gutters being arranged at the level of the tank and being spaced apart from each other and from the rib and the casing, a sheet of absorbent material depending from the rib alongside the side and rear walls of the receptacle and spaced therefrom by the pan, a sheet of absorbent material depending from each gutter wall, each sheet having its upper edge in the gutter or the tank, a pan supported below the receptacle, means for supplying water to the tank and gutters, and means for circulating air through the casing.

GUILFORD ROWE HARRILD.

Witnesses:
JOSEPH W. CODD,
LEONORE SWEENY.